United States Patent [19]

Walton

[11] Patent Number: 4,514,058
[45] Date of Patent: Apr. 30, 1985

[54] TRANSMISSION CABLE WITH HELICAL SUPPORT ELEMENTS OF CURVILINEAR PROFILE

[75] Inventor: John M. Walton, Doncaster, England

[73] Assignee: Bridon Limited, England

[21] Appl. No.: 355,155

[22] Filed: Mar. 5, 1982

[30] Foreign Application Priority Data

Mar. 6, 1981 [GB] United Kingdom ............... 8107035

[51] Int. Cl.³ .............................................. G02B 5/14
[52] U.S. Cl. .............................. 350/96.23; 174/128 R
[58] Field of Search ................ 350/96.23; 174/105 B, 174/109, 128 R, 131 R, 131 A

[56] References Cited

FOREIGN PATENT DOCUMENTS 2043936 10/1980 United Kingdom ............. 350/96.23

*Primary Examiner*—William L. Sikes
*Assistant Examiner*—Robert E. Wise
*Attorney, Agent, or Firm*—Lerner, David, Littenberg, Krumholz & Mentlik

[57] ABSTRACT

Metallic load-carrying elements (3,23) are helically spun around a central member (1,21) comprising a supporting member or members (9,24) constituting a structure (4,24) which defines at least one passage (6,26) wholly accommodating at least one electrical or optical transmission element (7,27). The transmission element is thereby protected against stresses applied to the load-carrying elements. The central structure is radially and longitudinally self-supporting. The central member (1,21) is formed by causing the supporting member or members (9,24) and the transmission element or elements (7,27) to converge to a point from which the central member (1,21) is withdrawn continuously. The load-carrying elements (3,23) are subsequently applied to the central member (1,21). Cables of practically unlimited length can be produced.

4 Claims, 16 Drawing Figures

TRANSMISSION CABLE WITH HELICAL SUPPORT ELEMENTS OF CURVILINEAR PROFILE

FIELD OF THE INVENTION

This invention relates to strain cables, i.e. cables which have both a load carrying function and a transmitting function. A strain cable may, for instance, transmit electrical power or signals or optical signals.

BACKGROUND TO THE INVENTION

In electro-mechanical cables the load-carrying elements are usually of steel, often high tensile, whereas the electrical transmitting elements comprise relatively ductile non-ferrous (e.g. copper) conductors and non-metallic materials (e.g. elastomers and plastics) which act as insulators. In the conventional types of electro-mechanical cables the load-carrying and the transmitting elements are spun together, typically in two distinct arrangements:
(1) transmitting elements are spun around a central load-carrying strength member, or
(2) load-carrying elements are spun around a central transmitting core, producing an armoured cable.

In the former case the transmitting elements are directly exposed to stress when used in a dynamic situation. In the latter case, the load carrying armour tends to exert substantial compressive stresses on the central transmitting core. These are a direct consequence of the helical formation of the load-carrying elements (wires or strands) and the tensile load applied to the armour. This tensile load results in radial stresses which are transmitted directly to the core. The uniform radial stresses due to tensile loading will be increased and rendered non-uniform where transverse loads are applied to the cable, e.g. at dies and over sheaves or fairleads.

In the conventional armoured cable these stresses occur inevitably both during the armouring process and in subsequent use of the cable. It is well known that such stresses can cause substantial deterioration of the electrical properties (e.g. attenuation) of the core. In dynamic situations, e.g. where the cable is repeatedly reeled under load, this deterioration may continue unabated until electrical failure (e.g. open circuit or insulation breakdown) occurs.

Recently, optical fibers have been introduced into armoured strain cables for signal-carrying purposes, and these are even more sensitive to mechanical stress and deformation than copper conductors.

There have previously been proposals for cable in the form of armoured tubes. In such a case, the conductor or other transmitting element has to be threaded along the tube, which severely limits the practical length of the cable; it would be impossible to produce strain cables of the order of a kilometer in length in this way. Furthermore, the tubes occupy an excessive proportion of the cross-section of the cable or do not contribute to its load-carrying capacity. U.K. patent specification No. 325 087 discloses a stranded wire rope having a core consisting of a single metal strip coiled helically to form a flexible tube. Such a tube has a very low longitudinal load-bearing capacity and cannot be made in unlimited length.

OBJECT OF THE INVENTION

The object of the invention is a strain cable which can be made in practically unlimited length, which is of minimum cross-sectional area for a given load-bearing capacity, and in which the transmission element or elements is or are protected against mechanical stresses.

SUMMARY OF THE INVENTION

The present invention provides a strain cable comprising a central member and at least one layer of metallic load-carrying elements helically spun around the central member, the central member comprising at least one supporting member and at least one transmission element, the at least one supporting member constituting a structure which defines at least one passage extending along the cable and wholly accommodating the at least one transmission element, thereby protecting the at least one transmission element against transverse stresses, the structure constituted by the at least one supporting member being sufficiently strong to resist reduction of the cross-section of the at least one passage when tension is applied to the cable in normal use, in which the structure constituted by the at least one supporting member is radially and longitudinally self-supporting and the central member is formed by causing the at least one supporting member and the at least one transmission element to converge to a point from which the central member is withdrawn continuously, the at least one layer of metallic load-carrying elements being applied to the central member.

Such a strain cable can be made by (a) causing the at least one supporting member and the at least one transmission element to converge to a point at which the said central member is formed and from which the thus-formed central member is withdrawn continuously, with the at least one supporting member constituting a radially and longitudinally self-supporting structure; and (b) helically spinning the at least one layer of metallic load-carrying elements around the central member.

One preferred method includes feeding the transmission element(s) to the forming point in axial alignment with the central member which is being formed, and feeding a plurality of metallic supporting members convergently to the forming point so as to form at least one tubular layer of interlocking helically-spun metallic supporting members. Thus, this structure has a single central passage which accommodates the transmission element(s). In another preferred method the passage or passages is or are in the periphery of the structure constituted by the at least one supporting member, the structure being fed to the forming point in axial alignment with the central member which is being formed, and the transmission element(s) being fed convergently to the forming point so as to enter the passage(s) laterally. The structure is preferably constituted by a single load-bearing member having at least one slot in its periphery, for wholly accommodating the transmission element(s).

The metallic load-carrying elements, which may be wires or strands, are preferably of steel or alloys whose tensile strength is of the same order of magnitude as steel.

Optionally, a soft material (such as an elastomer, wax, putty, a thixotropic gel, or cellular plastics material) surrounds the transmission element(s) within the passage(s) so as to support and guide the transmission element(s) without applying significant pressure.

It will be appreciated that, since the central member is formed continuously, the cable can be produced in practically unlimited lengths, typically several kilometers. The structure constituted by the supporting member(s) of the central member isolates the transmission element(s) from stresses generated in the layer(s) of helically spun metallic load-carrying elements by tensile loads, compressive loads, and bending. The external arrangement of the load-carrying elements ensures high strength and resistance to damage such as abrasion. The central arrangement of the transmission element(s) minimises the adverse effects of twisting and bending of the cable.

The invention will be described further, by way of example, with reference to the accompanying drawings.

BRIEF DESCRIPTION OF THE DRAWINGS

FIG. 9 is a cross-section through a strain cable incorporating the supporting member of FIG. 7a;

DESCRIPTION OF PREFERRED EMBODIMENTS

Figure 5:
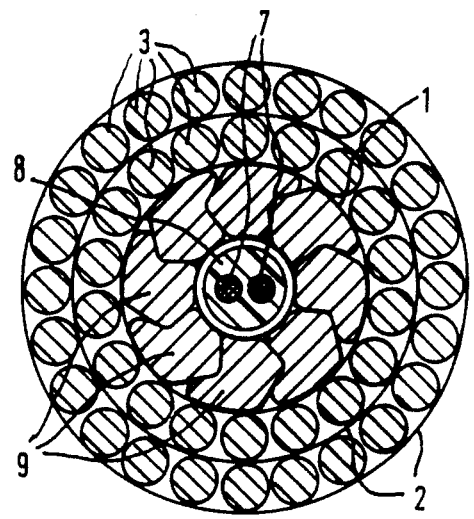
FIGS. 4, 5, and 6 are cross-sections through strain cables incorporating the supporting members of FIGS. 1, 2, and 3, respectively.
Figure 4:
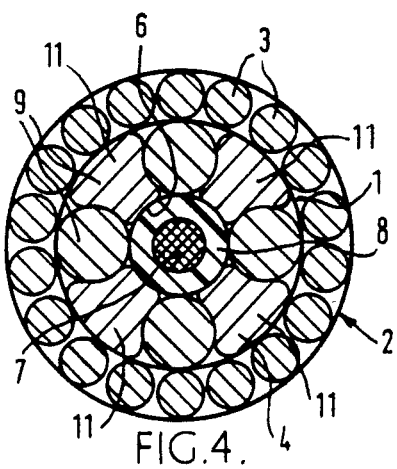
Figure 6:
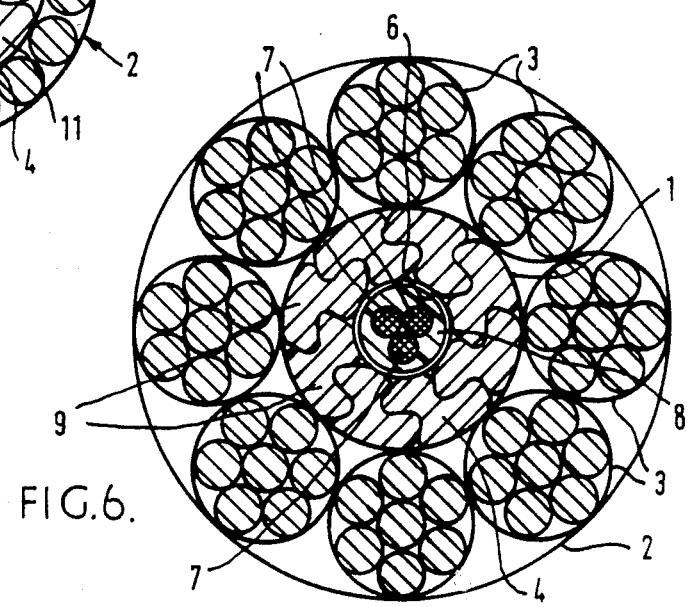
Figure 7A:
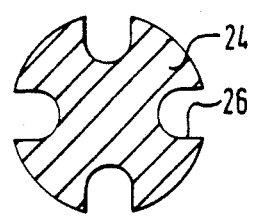
FIGS. 7a, 7b, 8a, and 8b are cross-sections through supporting members having peripheral slots.
Figure 7B:
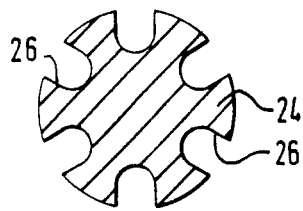
Figure 8A:
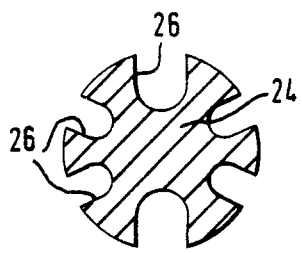
Figure 8B:
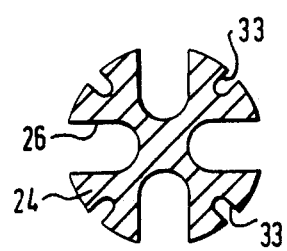

The strain cables illustrated in cross-section in FIGS. 4 to 6 each have a central member 1 around which one or more layers 2 of metallic load-carrying elements 3 (preferably of steel or a high-strength alloy) are helically spun. In FIGS. 4 and 5 the load-carrying elements 3 are wires; in FIG. 6 they are seven-wire strands. The central member 1 comprises a tubular structure 4 having a central passage 6 accommodating one or more transmission elements 7 (e.g. electrical conductors and/or optical fibers). The elements 7 are optionally sheathed in a soft material 8 (e.g. cellular plastics) applied by extrusion or wrapping, which supports and guides them without applying significant pressure.

Figure 1:
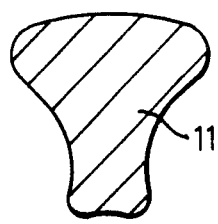
FIGS. 1, 2, 2a, and 3 are cross-sections through supporting members for use in forming a tubular layer of interlocking helically-spun members.
Figure 2:
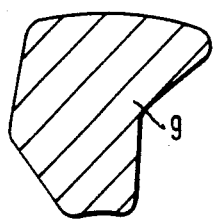
Figure 2A:
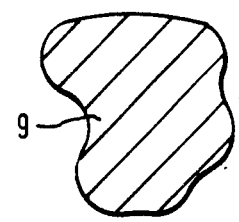
Figure 3:
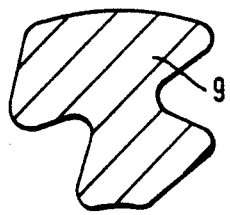

The tubular structure 4 is constituted by a tubular layer of interlocking metallic supporting members 9 which are helically spun. Optionally a further layer or layers of interlocking members may be provided. (Furthermore, the load-carrying elements may interlock in a similar way.) In the tubular structure 4 seen in FIG. 4 round wires alternate with shaped wires 11 of complementary cross-section (FIG. 1); although this construction provides adequate radial interlocking there is a possibility of instability because the mating sufaces are circular arcs in cross-section. The constructions of FIGS. 5 and 6 overcome this possible weakness by using interlocking members 9 which are all of the same shape (FIGS. 2 and 3, respectively) and which provide both radial interlocking and resistance to mutual rotation, thereby resisting deformation of the tubular layer from a circular shape. An alternative cross-section is shown in FIG. 2a. The shaped wires can be manufactured from metallic materials such as steel or a high strength alloy, using existing production techniques such as cold-rolling or drawing.

The tubular structure 4 serves as a stable (in particular, radially and longitudinally self-supporting) but flexible tube within which the electrical or optical elements can be carried with minimal stress. Adequate flexibility and stability can be achieved by appropriate selection of the following parameters of the interlocking members 9:
(a) section altitude (radial height);
(b) section width and conversely the number of interlocking members in a layer (a practical maximum would, in general, be about 12);
(c) helical pitch, in general the helix angle will be within the range 10° to 30°;
(d) section shape-sides keyed to prevent any displacement under external radial pressure.

A consequence of these considerations will be that the shapes will differ substantially from those used in shaped-wire cables. Preferably, the interlocking members are spun together without any circumferential clearances (i.e. tubed), whereas, in conventional rope and cable, shaped wire layers are deliberately designed with circumferential gaps between the wires. The structure 4 can easily be designed to be sufficiently strong to resist any reduction in cross-section when tension is applied to the cable in normal use, i.e. up to the designed maximum working load (a fraction of the breaking load). If demanded, the structure can be designed to resist reduction right up to the breaking load.

Figure 12:
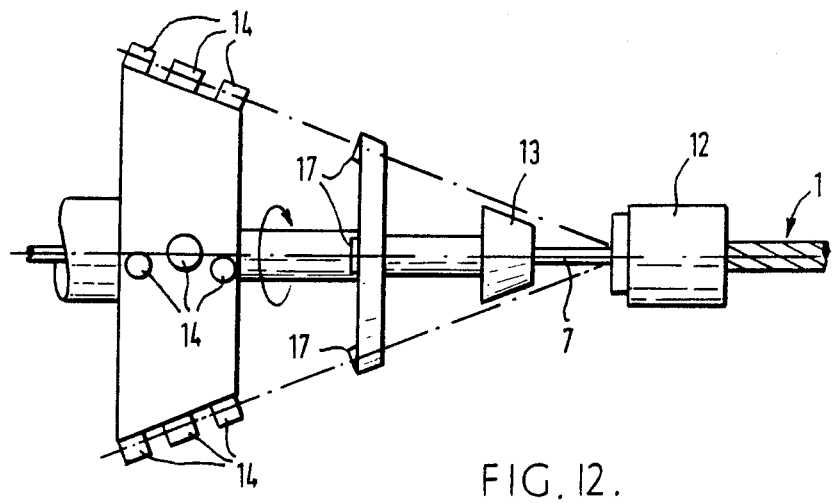
FIG. 12 diagrammatically illustrates apparatus for forming the central member of a strain cable.

The central members 1 described above may be made using apparatus such as that illustrated in FIG. 12. This has a close-fitting split die 12 to which the interlocking members 9 are fed convergently from rotating bobbins (not shown), while the transmission element 7 (or group of elements) is fed axially from a stationary bobbin. Only the general path of each member 9 is indicated in chain dotted line in FIG. 12. A frusto-conical nozzle 13 of wear resistant material such as hardened steel supports the members 9 as they approach the forming point defined by the die 12; the nozzle may have spokes or grooves (not shown) to space the members 9 apart. The members 9 are optionally preformed by rollers 14 which are profiled to prevent rotation of the members 9 about their own axes. The members 9 are guided into the correct attitude at the forming point by means of a plate 16 containing guide pellets 17 which are internally shaped to give a loose fit around the members 9 yet prevent them from rotating. The pellets 17 are preferably of very hard, wear-resistant material such as tungsten carbide.

The members 9 interlock in the die 12, to which a controlled pressure may be applied during spinning. The die parts are of hard, wear-resistant material such as Narite (a trade mark for aluminum bronzes, typically 14% Al, 4% Fe, balance Cu), having a smooth polished surface along the internal bore. The (non-rotating) transmission element 7 is fed into the centre of the die 12 using minimal tension and substantially free from any external pressure.

The member 1 which is withdrawn continuously from tie die 12 is fed to a conventional armouring machine (not shown) which applies the layer or layers 2 of metallic load-carrying elements 3 to the central member 1 by helical spinning. Alternatively, the member 1 is reeled so that it can be supplied to the armouring machine later or at another location.

Figure 9:
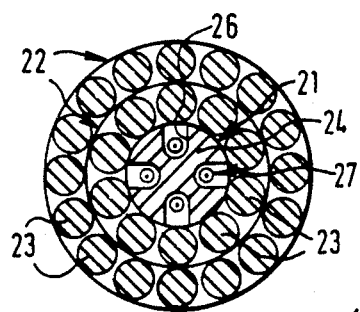
Figure 10:
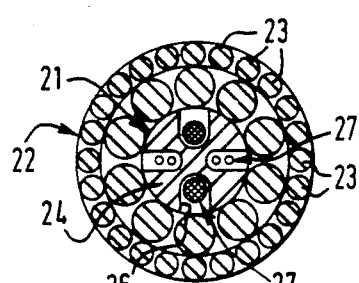
FIG. 10 is a cross-section through a strain cable incorporating another embodiment of a supporting member having peripheral slots.
Figure 11:
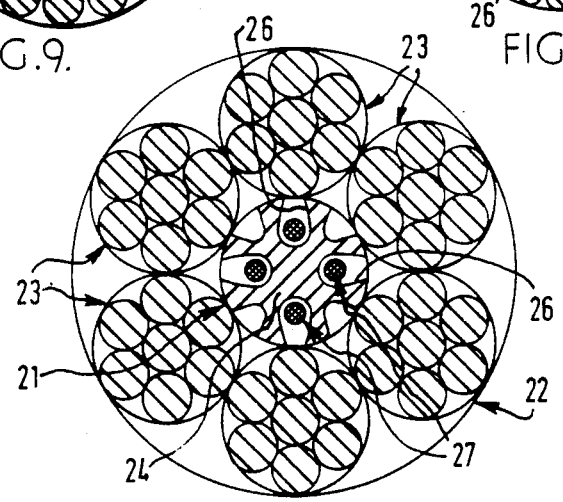
FIG. 11 is a cross-section through a strain cable incorporating the supporting member of FIG. 8b.

The strain cables illustrated in cross-section in FIGS. 9 to 11 each have a central member 21 around which one or more layers 22 of metallic load-carrying elements 23 (preferably of steel or a high-strength alloy) are helically spun. In FIGS. 9 and 10 the elements 23 are wires; in FIG. 11 they are seven-wire strands. The central member 21 comprises a single supporting member 24 having peripheral slots 26 wholly accommodating transmission elements 27 (e.g. electrical conductors and/or optical fibers). The elements 27 are optionally surrounded by soft adhesive or cohesive material (not shown). Possible forms of the supporting member 24 are shown in FIGS. 7a, 7b, 8a, and 8b by way of example only.

The supporting member 24 is of metal (e.g. steel or aluminum alloy) or a hard plastics material (e.g. nylon) or a composite material, and it may be produced by drawing, rolling, or extrusion. The slots 26 in the member 24 are designed to accommodate the required number and size of electrical and/or optical elements, whilst the radial spokes are strong enough to withstand (without buckling) the radial stresses imposed by the layer or layers 22 in normal use of the strain cable. The slots 26 may be either straight or twisted, depending on the intended application of the cable and especially the amount of bending to be imposed. The central members 21 described above may be made using apparatus such as that illustrated in FIG. 13. The supporting member 24 is fed continuously from a reel (not shown) along a given axis, while the transmission elements 27 (only two of which are shown) are fed continuously from bobbins 28 mounted on low-friction stands (not shown) positioned around and adjacent to the member 24. The elements 27 are guided convergently towards the slots 26 in the member 24 by means of rollers 29 applying only minimal tension, external pressure, and bending. Immediatly after the elements 27 have entered the slots 26 they are secured in position by introducing a soft adhesive or cohesive material (preferably a soft elastomer, wax, putty, or thixotropic gel) into the slots 26 by means of nozzles 31, so as to substantially fill the space around the elements 27. Surplus soft material is removed by a scraping device 32.

Alternative ways of securing the elements 27 in the slots 26 are (1) wrapping the outside of the member 21 with a strong thin film such as polyester (e.g. Melinex) or a fabric (e.g. cotton) tape;
(2) applying a twist to the member 21 by reeling it on to a rotating take-up stand (not shown);
(3) applying pressure (and possibly heat) to the supporting member 24 to produce a controlled modification of its shape so that the mouth of each slot 26 is narrowed to entrap the elements 27, e.g. as shown in FIG. 11, in which the shape of the member 24 shown in FIG. 8b has been modifed by inserting rollers of V-shaped radial cross-section into U-shaped grooves 33 between the slots 26.

Figure 13:
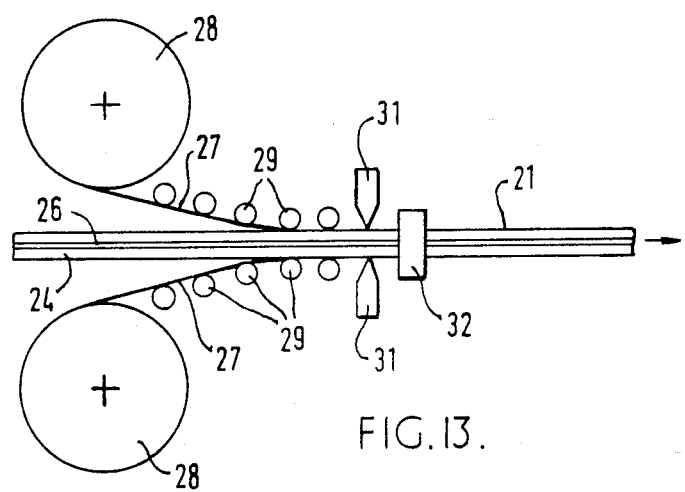
FIG. 13 diagrammatically illustrates another embodiment of such apparatus.

The member 21 which is withdrawn continuously from the apparatus of FIG. 13 is fed directly (or is reeled and subsequently fed) to a conventional armouring machine (not shown) which applies the layer or layers 22.

All of the cables described above may advantageousy be designed to be substantially non-rotating and torque-free under load.

I claim:

1. In a strain cable comprising a core which includes at least one transmission element; a structure which includes a tubular layer of interlocking metallic support members which are helically spun so as to form a single central passage accommodating the core; and at least one layer of metallic load-carrying elements helically spun around the structure, the improvement wherein the interlocking support members are wires of curvilinear profile having a helical pitch of 10° to 30°, the interlocking wires being at most twelve in number and the width, radial height and cross-sectional shape of the wires being such that the structure formed by the wires is radially and longitudinally self-supporting and sufficiently strong to resist reduction of the cross-section of the central passage when tension is applied to the cable in normal use and to protect the core against transverse stress.

2. A cable according to claim 1, wherein the core comprises a soft material which surrounds the at least one transmission element so as to support and guide it without applying significant pressure.

3. A cable according to claim 1, wherein the interlocking wires are of a material selected from the group consisting of steel and high-strength alloys.

4. A cable according to claim 1, wherein the interlocking wires are shaped to provide both radial interlocking and resistance to mutual rotation, thereby resisting deformation of the tubular layer from a circular shape.

* * * * *